(12) United States Patent
Sharma et al.

(10) Patent No.: US 12,435,253 B2
(45) Date of Patent: Oct. 7, 2025

(54) COMPOSITION FOR POLYMERIZATION AND GRAFTING TO A POLYSACCHARIDE OR AGRICULTURAL FIBERS AND METHOD OF MANUFACTURING THEREOF

(71) Applicant: GREEN BOOM CORP., Atlanta, GA (US)

(72) Inventors: Sudhir Sharma, Atlanta, GA (US); Yulin Deng, Marietta, GA (US)

(73) Assignee: Green Boom Corp., Atlanta, GA (US)

( * ) Notice: Subject to any disclaimer, the term of this patent is extended or adjusted under 35 U.S.C. 154(b) by 117 days.

(21) Appl. No.: 18/026,979

(22) PCT Filed: Feb. 24, 2021

(86) PCT No.: PCT/US2021/019411
§ 371 (c)(1),
(2) Date: Mar. 17, 2023

(87) PCT Pub. No.: WO2022/060406
PCT Pub. Date: Mar. 24, 2022

(65) Prior Publication Data
US 2024/0010894 A1     Jan. 11, 2024

Related U.S. Application Data

(60) Provisional application No. 63/079,949, filed on Sep. 17, 2020.

(51) Int. Cl.
*C09K 3/32*        (2006.01)
*B01J 20/24*       (2006.01)

(52) U.S. Cl.
CPC .................. *C09K 3/32* (2013.01); *B01J 20/24* (2013.01)

(58) Field of Classification Search
None
See application file for complete search history.

(56) References Cited

U.S. PATENT DOCUMENTS 2,692,861 A    10/1954   Weeks
2,754,206 A     7/1956   Olson
(Continued)

FOREIGN PATENT DOCUMENTS

WO    2014026207 A1    2/2014

OTHER PUBLICATIONS

Cellulose Nanofibers Modified with Alkyl Ketene Dimer for Oil Absorbent Articles, Cellulose Chem. Technol., 50 (3-4), 369-375 (2016) (Year: 2016).*

(Continued)

*Primary Examiner* — Peter A Salamon
(74) *Attorney, Agent, or Firm* — Meunier Carlin & Curfman LLC

(57) ABSTRACT

Described herein are absorbent compositions and methods of making and using the compositions. The absorbent composition including a hydrophilic cellulosic material functionalized with one or more hydrophobic chemical modification agents. The one or more hydrophobic chemical modification agents can be polymerized with or grafted to the hydrophilic cellulosic material via a chemical, physical or ionic bonds. The hydrophilic cellulosic material can exhibit an increased level of hornification. The method of making the absorbent composition including: a) contacting a hydrophilic cellulosic material with one or more hydrophobic chemical modification agents to form a precursor mixture; and b) allowing the one or more hydrophobic chemical modification agents to react with the hydrophilic cellulosic material to form an absorbent composition. The absorbent composition may be used for selective oil absorp- (Continued)

tion and/or chloroform absorption. For example, the compositions may be used for oil spills, leaks, or discharges cleanup and remediation.

17 Claims, 5 Drawing Sheets

(56) References Cited

U.S. PATENT DOCUMENTS

| | | | |
|---|---|---|---|
| 3,617,564 | A | 11/1971 | Vander Hooven et al. |
| 3,617,565 | A | 11/1971 | Fahlvik |
| 3,630,891 | A | 12/1971 | Peterson et al. |
| 3,739,913 | A | 6/1973 | Bogosian |
| 3,889,678 | A | 6/1975 | Chatterjee et al. |
| 4,070,287 | A | 1/1978 | Wiegand et al. |
| 4,519,918 | A | 5/1985 | Ericsson et al. |
| 4,537,877 | A * | 8/1985 | Ericsson ............... C02F 1/681 502/402 |
| 4,560,527 | A | 12/1985 | Harke et al. |
| 4,621,011 | A | 11/1986 | Fleischer et al. |
| 4,670,156 | A | 6/1987 | Grenthe |
| 4,753,917 | A | 6/1988 | Grenthe |
| 4,931,139 | A | 6/1990 | Phillips |
| 5,308,497 | A | 5/1994 | O'Donnell et al. |
| 5,763,083 | A | 6/1998 | Berrigan |
| 8,673,393 | B2 | 3/2014 | Yuan et al. |
| 2003/0146164 | A1 | 8/2003 | Robson et al. |
| 2007/0082815 | A1 | 4/2007 | Pihstrom |
| 2014/0315461 | A1 | 10/2014 | Schachtner et al. |
| 2018/0119334 | A1 * | 5/2018 | Netravali ............... C08B 15/05 |

OTHER PUBLICATIONS

International Search Report from Application No. PCT/US2021/019411, mailed May 6, 2021, 9 pages.

Delgado-Aguilar et al. "Cellulose nanofibers modified with alkyl ketene dimer for oil absorbent aerogels". Cellulose Chemistry and Technology. Vol 50. 369-375. (2016). [Retrived on Apr. 23, 2021] Retrived from Internet: <URL: https://www.cellutosechemtechnol.ro/pdf/CCT3-4(2016)/p.369-375.pdf>, entire document, especially abstract, pp. 371 and 373.

European Search Report from correspondence EP4214180, dated Sep. 30, 2024, 10 pages.

Office Action from corresponding BR 11 2023 004995 4, dated Feb. 25, 2025, 2 pages.

* cited by examiner

COMPOSITION FOR POLYMERIZATION AND GRAFTING TO A POLYSACCHARIDE OR AGRICULTURAL FIBERS AND METHOD OF MANUFACTURING THEREOF

CROSS-REFERENCE TO RELATED APPLICATIONS

This application claims the benefit of priority to 63/079,949 filed Sep. 17, 2020, the disclosure of which is incorporated herein by reference in its entirety.

BACKGROUND

Crude oil spills with increasing exploration of fracking sites, shale reserves, and deep ocean exploration to extract hydrocarbons is expected to continue to increase in the future. Oil discharges, accidental spills, and run off of oily waste from drilling sites, have contaminated large land areas, creating direct hazards to the use of land. Spills of gasoline, diesel, other fuels, and industrial oils during handling are inevitable and will continue as well. Oil spills of all varieties decidedly cause long term environmental damage and are expensive to manage. In the ocean crude oil spills cause irreversible damage to marine ecosystems and marine life, damage shorelines, and cause large economic loss. Whereas spills in industrial or work settings result in hazardous working conditions and worker injury.

While spills themselves are dangerous, post spill cleanup has deleterious consequences as well. Oil sorbents used for removing spilled oil on water surface are made from materials that are water repellent or hydrophobic and have a high degree of affinity for oil. The oil absorbents that are widely used in oil/water separation are generally made from petroleum derived or man-made hydrophobic fibers, particles, or fabrics, including but not limited to polypropylene, polyethylene, polystyrene, nylon, and viscose, which are inherently water repellent. These materials are non-biodegradable and must be disposed of in landfill or via incineration, both methods have significant environmental drawbacks. While landfill disposal results in perennial waste management problems for the landfill site, incineration may result in toxic residue that eventually find their way to landfill resulting in the same problem albeit smaller in scale. Currently majority of oil spills are cleaned up by polypropylene based absorbents. Commercially they are available in forms known as pads, pillows, socks, or booms. These usually consist of a spun bound polypropylene skin material encapsulating a melt blown polypropylene foam or some combination in the respective shapes and forms. Once oil is absorbed in the absorbents, the oil saturated materials are disposed of in landfills in most cases. In some cases, the materials are incinerated. Polypropylene does not biodegrade and remains in landfill saturated with absorbed oil perpetually. Polypropylene itself is a non-renewable resource and is derived from a byproduct of crude extraction in the first place.

In order to reduce the solid waste pollution, oil absorbents that are biodegradable, derived from biomass, such as from lignocellulosic or cellulosic materials are important. Biomass sorbents are cheap, efficient, environmentally friendly, and easy to deploy. These materials suffer from the limitation of being hydrophilic and lack selectivity to absorb oil only. While these materials have capacity to absorb oil, they are hydrophilic and will absorb both water and oil. Biomass based materials are known to be hydrophilic and after being in contact with water become saturated with water. Therefore, biomasses cannot be directly used to effectively absorb oil from water's surface. The absorption of water reduces the oil absorption capacity rendering these materials not ideal for such an application. These may be used in some land-based spills where no water is present. This makes ubiquitous, hydrophobic polypropylene the leading material choice for use in cleanup of oil spills. Therefore, due to the hydrophilic nature of these fibers, fillers, and fabrics they must be converted to hydrophobic materials which can maximally absorb oil but repel water.

Research and development for preparing absorbent textile materials that exhibit water repellency has always been considered as one of the important focus area in the technical domain. Prior art literature illustrates a variety of textile coating materials and compositions such as rubber, oil-rubber mixtures, synthetic dopes for various applications.

Using biomass materials as oil absorbents and the chemical modification of biomass particles to hydrophobic/lyophilic has been disclosed in various patents and publications (e.g., U.S. Pat. Nos. 3,739,913, 4,519,918, 4,519,918, 770, 575, 770,575A, 4,670,156, 4,753,917, 5,308,497, 4,931,139, 4,560,527, 4,621,011, 3,617,565A, 3,630,891, 2,754,206, 5,763,083A, 3,617,564, 2,692,861, 8,673,393B2, 4,070, 287A and U.S. Patent application No. 2007/0082815A1).

However, although above patents have disclosed the use of biomass particles, there are several problems related to the materials or the treatment methods. Some of the patents above used unmodified biomass materials which are hydrophilic so they can only be used for universal absorbents, i.e. they absorb both water and oil so they cannot be used for separating oil from water surface. Other reference patents mentioned above using different chemicals to convert hydrophilic biomass to hydrophobic and lyophilic, but all these methods are mixed pre-grinded biomass particles with large modifying chemical solvents, water suspension or emulsion, followed by drying at high temperature. The key disadvantage of these processes is the high energy consumption during dewatering and drying. Furthermore, some of these treatments may render the resulting composite material to be non-biodegradable. Some of the above patent used vapor deposition method to coating hydrophobic chemicals on biomass particle surface, which is even more energy intensive.

Some of these materials simply are not adequately absorbent to pick up large quantities of oil from the water surface. Others, even when used in relatively large amounts, leave an oil sheen on the water surface. Some all too quickly become saturated with water and sink below the surface of the water such that the oily material cannot be recovered. This creates environmental problems for marine life at the bottom of the sea. Some absorb oil all too slowly, and the oil does not bond to the material with high affinity. Few, if any, of these materials are effective as agents for scrubbing the soil, and exposed rocks of an oil contaminated shore.

Therefore, there is a need for biodegradable oil absorbent compositions and methods of making. Further, there is a need for biodegradable oil absorbent compositions for selective oil absorption, chloroform absorption, and alike.

The compositions and methods disclosed herein address these and other needs.

SUMMARY

Described herein are absorbent compositions and methods of making and using the compositions. Described is an absorbent composition including a hydrophilic cellulosic material functionalized with one or more hydrophobic chemical modification agents. The one or more hydrophobic chemical modification agents can include an alkyl ketene dimer (AKD), alkenyl succinic anhydride (ASA), rosin, rosin salts, cationic molecules with alkyl chains (5-18 carbons) including quarternary ammonium surfactant such as C8-10 alkylamidodimethyl propylamines, C8-10 alkyl hydroxyethyl dimethylammonium chloride, and epoxy groups such as 2-(tertbutyl)oxirane, and 2-cyclohexyloxirane, alkyl molecules with anhydride groups such as carboxylic anhydride, alkyl molecules with acryl groups such as alkyl acrylates, polyacrylate, poly(methyl methacrylate), or a combination thereof. The one or more hydrophobic chemical modification agents can be polymerized with or grafted to the hydrophilic cellulosic material via a chemical, physical or ionic bonds. The hydrophilic cellulosic material can exhibit an increased level of hornification.

In some embodiments, the hydrophobic chemical modification agent(s) is present in an amount of from 0.5 wt % to 10 wt % based on the weight of the hydrophilic cellulosic material. In some embodiments, the hydrophobic chemical modification agent is in the form of a solid, a solution, a suspension, or an emulsion. In some embodiments, the one or more hydrophobic chemical modification agent may be alkyl ketene dimer (AKD).

In some embodiments, the hydrophilic cellulosic material is derived from an agricultural material. In some embodiments, the hydrophilic cellulosic material can be a lignocellulosic material. In some embodiments, the hydrophilic cellulosic material can be a banana fiber, pineapple fiber, cotton fiber, palm fiber, corn fiber, corn husk, corn pith, corn chaff, corn cob, corn cob powder, jute fiber, bamboo fiber, sisal fiber, cellulose fibers, grass (e.g., miscanthus grass, switchgrass, Chinese silver grass, silver grass, fountain grass, pampas grass, feather reed grass, calamagrostis, hakone grass, muhlenbergia, muhly grass, Mexican geathergrass, needgle grasses, deschampsia, helictotrichon, cogon grass, big blustem, sporobolus, lawngrass), wheat straw, waste papers, algae, wood, kapok, ccoir, flax, hemp, kenaf, lyocell, modal, raffia, ramie, rayon, soy protein, apocynum cannabinum, cedar bark textile, esparto, fique, papyrus, straw, and tapa textile cloth, or a combination thereof. In some embodiments, the hydrophilic cellulosic material is raw or pre-grinded.

In some embodiments the absorbent composition exhibits an oil absorption capacity of from 200% to 300% by weight of the material. In some embodiments the absorbent composition exhibits a water absorption capacity of less than 3% by weight of the material.

In some embodiments, the absorbent composition exhibits a water retention value of from 0.1 L/lb to 5 L/lb.

In some embodiments, the absorbent composition can be a biodegradable water repellent cloth or a biodegradable water repellent particle, or biodegradable water repellent article. In some embodiments, the biodegradable water repellent cloth forms the outer surface of the biodegradable water repellent article. In some embodiments, the biodegradable water repellent article is filled with biodegradable water repellent particles. In some embodiments, the biodegradable water repellent article is an absorbent pillow, sock, or boom.

Described is also a method of making the absorbent composition including: a) contacting a hydrophilic cellulosic material with one or more hydrophobic chemical modification agents to form a precursor mixture; and b) allowing the one or more hydrophobic chemical modification agents to react with the hydrophilic cellulosic material to form an absorbent composition.

In some embodiments, the hydrophilic cellulosic material is washed with deionized water prior to step (a). In some embodiments, step (a) is performed in an aqueous or organic solvent.

In some embodiments, the contacting step (a) includes grinding or milling the hydrophilic cellulosic material and the hydrophobic chemical modification agent(s). In some embodiments, the particle size of the hydrophobic chemical modification agent(s) and the hydrophilic cellulosic material after grinding is from 10 nm to 5 mm.

In some embodiments, the contacting step (a) includes applying to the hydrophilic cellulosic material a hydrophobic solution or emulsion including the hydrophobic chemical modification agent(s). In some embodiments, the concentration of the hydrophobic chemical solution/emulsion is of from 1% to 10% by weight of hydrophilic cellulosic material. In some embodiments, the contacting step (a) includes either a dipping process or a spray process. In some embodiments, the dipping process involves submerging the hydrophilic cellulosic material in the hydrophobic solution or emulsion for a period of time effective to functionalize the hydrophilic cellulosic material. In some embodiments, the period of time can be from 1 minute to 10 minutes. In some embodiments, the period of time can be effective to afford a percent uptake of the one or more hydrophobic chemical modification agents of from 1% to 10% by weight of the hydrophilic cellulosic material.

In some embodiments, the method further comprises a heating/drying step after step (a) or during step (b). In some embodiments, the heating/drying temperature is of from 40° C. to 250° C. for 10 minutes to 60 minutes, preferably the temperature is of from 80° C. to 130° C. In some embodiments, the heating temperature is greater than 100° C. to 150° C. for cloth. In some embodiments, the heating temperature is greater than 100° C. to 170° C. for particles. In some embodiments, the drying step is a dewatering step.

The absorbent composition may be used for selective oil absorption and/or chloroform absorption. For example, the compositions may be used for oil spills, leaks, or discharges cleanup and remediation.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
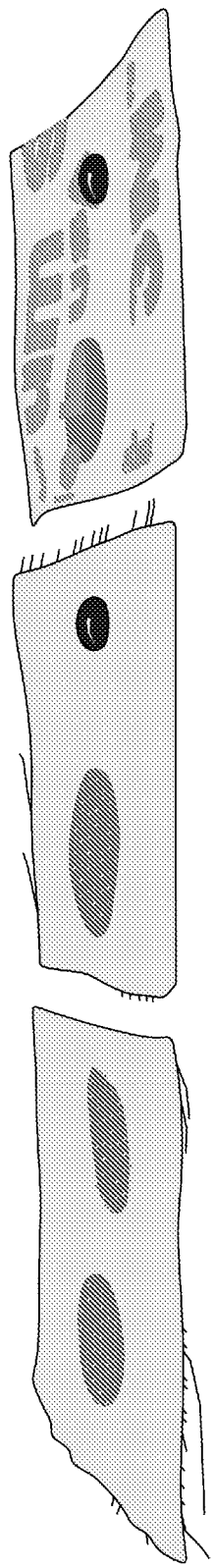
FIG. 1 is a picture showing a 6 in×6 in swatch of broadcloth cotton fabric dipped in a homogenized AKD suspension with 3% solids content. For the hydrophobic broadcloth fabric, when water is dropped on the fabric a bead forms and does not pass through the fabric, while an oil droplet is instantly absorbed (center). The same performance is observed with commercially obtained polypropylene absorbent skin (right). Whereas, untreated broadcloth fabric absorbs both water and oil droplets instantly (left).

A number of embodiments of the disclosure have been described. Nevertheless, it will be understood that various modifications may be made without departing from the spirit and scope of the invention.

Definitions

To facilitate understanding of the disclosure set forth herein, a number of terms are defined below. Unless defined otherwise, all technical and scientific terms used herein have the same meanings as commonly understood by one of skill in the art to which the disclosed invention belongs. Publications cited herein and the materials for which they are cited are specifically incorporated by reference.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing quantities of ingredients, reaction conditions, geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a", "an", and "the" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

"Biomass" in this context referring to any lignocellulosic or cellulosic materials made from or derived from various crops and agricultural materials.

The term "Hornification" as used herein refers to the process by which the cellulosic material free hydroxyl groups lose the bridging water hydrogen bond between them and become increasingly irreversibly bound to each other. Hornification can cause an increase in crystallinity, shrinking of fibers, degradation of the amorphous cellulose phase, and most notably an increase in the hydrophobicity of the material. This is attributed to the reduction in free hydroxyls available to hydrogen bond with water after hornification.

Reference will now be made in detail to specific aspects of the disclosed materials, compositions, articles, and methods, examples of which are illustrated in the Examples section.

Compositions

Described herein are absorbent compositions including a hydrophilic cellulosic material functionalized with one or more hydrophobic chemical modification agents. The one or more hydrophobic chemical modification agents can include an alkyl ketene dimer (AKD), alkenyl succinic anhydride (ASA), rosin, rosin salts, cationic molecules with alkyl chains (5-18 carbons) including quarternary ammonium surfactant such as C8-10 alkylamidodimethyl propylamines, C8-10 alkyl hydroxyethyl dimethylammonium chloride, and epoxy groups such as 2-(tertbutyl)oxirane, and 2-cyclohexyloxirane, alkyl molecules with anhydride groups such as carboxylic anhydride, alkyl molecules with acryl groups such as alkyl acrylates, polyacrylate, poly(methyl methacrylate), or a combination thereof. The one or more hydrophobic chemical modification agents can be polymerized with or grafted to the hydrophilic cellulosic material via a chemical, physical or ionic bonds. The hydrophilic cellulosic material can exhibit an increased level of hornification.

In some embodiments, the hydrophobic chemical modification agent(s) is present in an amount of from 0.5 wt % to 10 wt % by weight of the hydrophilic cellulosic material, such as from 1 wt % to 7 wt %, 1.5 wt % to 8 wt %, from 2 wt % to 5 wt %, or from 2 wt % to 7 wt % by weight of the hydrophilic cellulosic material. In some embodiments, the hydrophobic chemical modification agent is in the form of a solid, a solution, a suspension, or an emulsion. In some embodiments, the one or more hydrophobic chemical modification agent may be alkyl ketene dimer (AKD).

In some embodiments, the cellulosic material is derived from an agricultural material. In some embodiments the cellulosic material can be a lignocellulosic material. In some embodiments, the cellulosic material can be a banana fiber, pineapple fiber, cotton fiber, palm fiber, corn fiber, corn husk, corn pith, corn chaff, corn cob, jute fiber, bamboo fiber, sisal fiber, cellulose fibers, grass, wheat straw, waste papers, algae, wood, kapok, ccoir, flax, hemp, kenaf, lyocell, modal, raffia, ramie, rayon, soy protein, apocynum cannabinum, cedar bark textile, esparto, fique, papyrus, straw, and tapa textile cloth, or a combination thereof. In some embodiments, the cellulosic material is raw or pre-grinded.

In some embodiments the absorbent composition exhibits an oil absorption capacity of from 200% to 300% by weight of the material, such as from 210% to 250% by weight of the material, from 220% to 250% by weight of the material, from 230% to 250% by weight of the material, from 230% to 240% by weight of the material, from 220% to 260% by weight of the material, from 220% to 280% by weight of the material, from 220% to 240% by weight of the material, from 220% to 300% by weight of the material, from 230% to 260% by weight of the material, from 230% to 280% by weight of the material, from 230% to 300% by weight of the material, from 250% to 300% by weight of the material, or from 240% to 300% by weight of the material.

In some embodiments the absorbent composition exhibits a water absorption capacity of less than 3% by weight of the material, such as less than 2.75% by weight of the material, less than 2.5% by weight of the material, less than 2.25% by weight of the material, less than 2.0% by weight of the material, less than 1.75% by weight of the material, less than 1.5% by weight of the material, less than 1.25% by weight of the material, less than 1.0% by weight of the material, less than 0.5% by weight of the material, less than 0.25% by weight of the material, or less than 0.1% by weight of the material.

In some embodiments, the absorbent composition exhibits a water retention value of from 0.1 L/lb to 5 L/lb. For example, the water retention value can range from 0.1 L/lb to 0.5 L/lb, from 0.1 L/lb to 1 L/lb, from 0.1 L/lb to 1.5 L/lb, from 0.1 L/lb to 2 L/lb, from 0.1 L/lb to 2.5 L/lb, from 0.1 L/lb to 3 L/lb, from 0.1 L/lb to 3.5 L/lb, from 0.1 L/lb to 4 L/lb, from 0.1 L/lb to 4.5 L/lb, or from 0.1 L/lb to 5 L/lb.

In some embodiments, the absorbent composition can be a biodegradable water repellent cloth or a biodegradable water repellent particle, or biodegradable water repellent article. In some embodiments, the biodegradable water repellent cloth forms the outer surface of the biodegradable water repellent article. In some embodiments, the biodegradable water repellent article is filled with biodegradable water repellent particles. In some embodiments, the biodegradable water repellent article is an absorbent pillow, sock, or boom.

Methods of Making

Described herein is a method of making the absorbent composition including: a) contacting a hydrophilic cellulosic material with one or more hydrophobic chemical modification agents to form a precursor mixture; and b) allowing the one or more hydrophobic chemical modification agents to react with the hydrophilic cellulosic material to form an absorbent composition.

In some embodiments, the hydrophilic cellulosic material exhibits an increased level of hornification. In some embodiments, the hydrophilic cellulosic material is lignocellulosic. In some embodiments, the biomass material is raw or pre-grinded. In some embodiments, the biomass material can be a banana fiber, pineapple fiber, cotton fiber, palm fiber, corn fiber, corn husk, corn pith, corn chaff, jute fiber, bamboo fiber, sisal fiber, cellulose fibers, grass, wheat straw, waste papers, algae, wood, kapok, ccoir, flax, hemp, kenaf, lyocell, modal, raffia, ramie, rayon, soy protein, apocynum cannabinum, cedar bark textile, esparto, fique, papyrus, straw, and tapa textile cloth, or a combination thereof.

In some embodiments, the hydrophobic chemical modification agent(s) is present in an amount of from 0.5 wt % to 10 wt % by weight of the hydrophilic cellulosic material, such as from 1 wt % to 7 wt %, 1.5 wt % to 8 wt %, from 2 wt % to 5 wt %, or from 2 wt % to 7 wt % by weight of the hydrophilic cellulosic material.

In some embodiments, the hydrophobic chemical modification agent can include an alkyl ketene dimer (AKD), alkenyl succinic anhydride (ASA), rosin and rosin salts thereof, cationic molecules with alkyl chains (5-18 carbons) including quarternary ammonium surfactant such as C8-10 alkylamidodimethyl propylamines, C8-10 alkyl hydroxyethyl dimethylammonium chloride, and epoxy groups such as 2-(tertbutyl)oxirane, and 2-cyclohexyloxirane, alkyl molecules with anhydride groups such as carboxylic anhydride, alkyl molecules with acryl groups such as alkyl acrylates, polyacrylate, poly(methyl methacrylate), or a combination thereof. In some embodiments, the hydrophobic chemical modification agent is an alkyl ketene dimer (AKD). In some embodiments, the hydrophobic chemical modification agent polymerizes and grafts to the polysaccharide via a chemical and physical or ionic bond. In some embodiments, the hydrophobic chemical modification agent is in the form of a solid, a solution, a suspension, or an emulsion. In some embodiments, the hydrophilic cellulosic material is washed with deionized water prior to step (a). In some embodiments, step (a) is performed in an aqueous or organic solvent.

In some embodiments, the contacting step (a) includes grinding or milling the hydrophilic cellulosic material and the hydrophobic chemical modification agent(s). In some embodiments, the particle size of the hydrophobic chemical modification agent(s) and the hydrophilic cellulosic material after grinding is from 10 nm to 5 mm, such as from 10 nm to 500 nm, from 500 nm to 3 mm, from 1 µm to 2 mm, from 100 nm to 1 µm, from 1 µm to 100 µm, from 100 µm to 0.5 mm, from 100 nm to 300 µm, from 100 µm to 1 mm, or from 1 mm to 5 mm.

In some embodiments, the contacting step (a) includes applying to the hydrophilic cellulosic material a hydrophobic solution or emulsion including the hydrophobic chemical modification agent(s). In some embodiments, the concentration of the hydrophobic chemical solution/emulsion is of from 1% to 10% by weight of hydrophilic cellulosic material, such from 1% to 8% by weight, from 1% to 6% by weight, from 1% to 4% by weight, from 1% to 2% by weight, from 2% to 4% by weight, from 2% to 6% by weight, from 2% to 8% by weight, from 2% to 10% by weight, from 4% to 6% by weight, from 4% to 8% by weight, from 4% to 10% by weight, from 6% to 10% by weight, or from 8% to 10% by weight of the hydrophilic cellulosic material. In some embodiments, prior to step (a) the hydrophobic solution or emulsion is prepared by dissolving the hydrophobic chemical modification agent(s) in an aqueous or organic solvent.

In some embodiments, the contacting step (a) includes either a dipping process or a spray process. In some embodiments, the dipping process involves submerging the hydrophilic cellulosic material in the hydrophobic solution or emulsion for a period of time effective to functionalize the hydrophilic cellulosic material. In some embodiments, the period of time can be from 1 minute to 10 minutes such as from 1 minute to 5 minutes, from 1 minute to 3 minutes, from 2 minutes to 5 minutes, or from 2 minutes to 10 minutes.

In some embodiments, the period of time can be effective to afford a percent uptake of the one or more hydrophobic chemical modification agents of from 1% to 10% by weight of the hydrophilic cellulosic material, such as from 1% to 7.5% by weight, from 1% to 5% by weight, from 1% to 2.5% by weight, from 2% to 5% by weight, from 5% to 10% by weight, or from 7.5% to 10% by weight of the hydrophilic cellulosic material.

The period of time effective to functionalize the hydrophilic cellulosic material depends on the time required by the hydrophilic cellulosic material to uptake the one or more hydrophobic chemical modification agents to afford a percent uptake of the one or more hydrophobic chemical modification agents of from 1% to 10% by weight of the hydrophilic cellulosic material, such as from 1% to 7.5% by weight, from 1% to 5% by weight, from 1% to 2.5% by weight, from 2% to 5% by weight, from 5% to 10% by weight, or from 7.5% to 10% by weight of the hydrophilic cellulosic material. The percent uptake by the hydrophilic cellulosic material can be measured by mass change before and after modification in combination with equipment analysis such as FT-IR measurement.

In some embodiments, the method further comprises a heating/drying step after step (a) or during step (b). In some embodiments, the heating/drying temperature is of from 40° C. to 250° C. for 10 minutes to 60 minutes, preferably the drying temperature is of from 80° C. to 130° C. In some embodiments, the heating temperature is greater than 100° C. to 150° C. for cloth. In some embodiments, the heating temperature is greater than 100° C. to 170° C. for particles. In some embodiments, the drying step is a dewatering step.

In some embodiments, the biomass material can be a cotton or cellulosic natural fiber-based cloth. In some embodiments, the cloth can be a non-woven fabric.

In some embodiments, the hydrophilic cellulosic material may be double coated with the hydrophobic chemical modification agent(s). For example, agricultural fibers may be double coated with alkyl ketene dimer (AKD). In some embodiments, when a water droplet is placed on the surface of the coated agricultural fiber, a nearly spherical droplet may be formed and steadily stayed on the cloth, particle, or article for extended time. This illustrates water repellency for the alkyl ketene dimer (AKD) coated agricultural fibers. Whereas when an oil droplet is placed on the fiber surface it instantly disappears due to absorption by the fibers, which illustrates the selective affinity for oil over water by the AKD coated agricultural fibers.

Methods of Use

The absorbent composition may be used for selective oil absorption and/or chloroform absorption. For example, the compositions may be used for oil spills, leaks, or discharges cleanup and remediation. The alkyl ketene dimer (AKD) coated agricultural fibers (e.g., cotton fabric) may be used for selective oil absorption.

In some embodiments, when the absorbent composition is a biodegradable water repellent particle, the composition may be used to absorb oil from the surface of an object by scattering the absorbent composition directly on the oil surface. In some embodiments, the absorbent composition can be used by contacting oil with the biodegradable water repellent particles, biodegradable water repellent cloth, or biodegradable water repellent article. In some embodiments, the article can be a pillow, boom, or sock. In some embodiments, the pillow, boom, or sock can be reused after the drying.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference. It is to be expressly understood, however, that each of the figures is provided for the purpose of illustration and description only and is not intended as a definition of the limits of the present invention.

By way of non-limiting illustration, examples of certain embodiments of the present disclosure are given below.

EXAMPLES

Described is the modification of biomass surface from hydrophilic to hydrophobic and lyophilic either directly using raw biomass materials (un-grinded) or pre-grinded particles without using water suspension, emulsion, or solvent. A variety of hydrophobic agents may be used to achieve these depending on the starting material and final effects desired. The hydrophobic chemical modification agent(s) may be alkyl ketene dimer (AKD), alkenyl succinic anhydride (ASA), rosin, rosin salts, molecules with alkyl chains (5-18 carbons) and epoxy groups, alkyl molecules with anhydride groups; alkyl molecules with cationic charges, or alkyl molecules with acryl groups.

Shown here will be examples using AKD in solid form as well as liquid suspension.

Disclosed is not only the modification of biomass fibers or particles, but also fabrics. To make completely biodegradable absorbent articles such as pillow, sock and booms, both external skin and inside filler should be biodegradable. The hydrophobic biomass cloth can be used as the skin for pillows, socks and booms. The hydrophobic biomass particles can be used as fillers for pillows, socks and booms for oil absorption from water surface. With these biomass fillers and skin, the entire absorbent pillows, socks, and booms are completely hydrophobic, oil absorbent, and biodegradable. A significant feature of the fabric is that it is permeable but hydrophobic so oil not water may pass through the fabric without significant resistance. To make hydrophobic fabrics, the modification chemicals are delivered to the biomass fabrics such as cotton cloth by spray coating, dip coating, or bled knife coating, followed by heating.

For forming particles or fibers from agricultural biomass the solid AKD (alkyl ketene dimer) or resin particles are directly added to a grinder or milling machine with raw biomass together. The solid AKD or resin are grinded during biomass grinding process. The small AKD or resin particles on biomass particle surface will melted and spread on the biomass particle surface when they are heated to 60-130° C. The thin layers of AKD or resins can anchor to the biomass particle surface by forming either chemical or physical bonds to alternate the biomass to hydrophobic and lyophilic. To improve the modification efficiency, the solid AKD or resins can be pre-grinded into small particles with a size of 10 nm to few hundreds micrometers. Adding small amount of water or using AKD/resin emulsion or suspension directly before biomass grinding is another option.

Biomass used for the assays were corn cob dust, corn cob pellets, dried grass, dried grass pellets, broadcloth cotton textile, cotton duck canvas (6 to 24 oz cotton duck canvas), griege cotton fabric or like. The hydrophobic chemical modification agent was selected based on the type of biomass used. In case of fabric or textile samples a dip and squeeze or spray coat method was employed for application of the hydrophobic chemical modification agent, whereas in the case of particulate samples high shear mixing was employed.

The hydrophobic chemical modification agent(s) can be applied to the biomass depending on the form of the biomass. In the case to make hydrophobic particles such as fibers, fiber dust, or pellets the hydrophobic chemical modification agent(s) are blended with the biomass either before or after the biomasses are grinded. The hydrophobic chemical modification agent(s) can be solid particles or their water suspension, emulsion, or solvent.

In the case of textile, fabric, or non-woven fabric the hydrophobic chemical solution including the hydrophobic chemical modification agent(s) can either be spray coated, bled knife coated, or dip coated on to the biomass.

The hydrophobic chemical modification agent(s) can be applied to the biomass in a ratio of from 0.25% to 25% by weight of biomass, preferably of from 2 to 7% by weight of biomass, based on the final property desired.

General Procedure for Hydrophobic Coating of Fabrics

Prior to AKD coating, the fabric may be washed with DI water to remove impurities and then dried. The agricultural fiber can be used as a clump or dry powder if that is the starting form. 1.5% of the alkyl ketene dimer (AKD) on a basis of the agricultural fiber weight, may be dissolved in chloroform or water for dipping the agricultural fiber. After dipping the fiber into the AKD solution, the fiber may be allowed to dry for about 1 hour in a fume hood and then may be placed into drying oven at 105° C. for 0.5 hours. After repeating the dipping procedure, double the alkyl ketene dimer (AKD) coated agricultural fibers may be prepared and then used for the selective oil absorption tests.

General Procedure: Cotton or Other Cellulosic Fabric Modification

Cotton textiles such as cotton broadcloth, canvas, duck canvas, greige fabric may be used for this application. Cotton fabric is dipped in a well homogenized AKD suspension of concentration 1-10% by weight. The fabric is submerged in the suspension from 1-10 minutes depending on AKD uptake desired. Generally, an uptake of 1-10% of AKD by fabric weight is necessary to achieve the desired effect. After dipping, the fabric may be dried initially at room temperature and then heated in an oven to a temperature higher than AKD or resin melting temperature but lower than the fabric degradation temperature, preferably 80° C.-130° C. for 10 to 60 minutes. The coated fabric may be heated one or more treatment cycles, depending on hydrophobic chemical selected, equipment utilized, and final effect desired. The treated fillers are cooled down to room temperature and collected.

Generally, this process is done in a continuous fashion on a coating line where the fabric is moving constantly via conveyor. Fabric coating may happen via various methods including spray coating, dip coating, or bled knife coating. The fabric is heated in a conveyor oven which is connected to the conveyor line post the coating phase of the process. In this case, the conveyor speed is adjusted to obtain the desired dwell time in the oven.

Depending on the equipment, thermal treatment may be applied in multiple steps if it is needed. The first thermal treatment step may be dewatering and drying at temperatures between 25° C.-90° C., followed by a curing step between 40° C.-250° C. but preferably between 80° C.-130° C.

General Procedure: Biomass Particle Modification

The raw biomass, such as all kinds of grasses, wheat straws, corn cods and stalks, tree leaves, pine straws, papers, wood branches, cellulose fibers and like, is fed to a grinder or milling machine. After sometime, the required amount of AKD or resin pellets, usually is between 1-7 wt % based on biomass weight, are continuously fed to the grinder. The biomass and AKD pellets are grinded to the required biomass particle size, usually between 100 micrometers to a few millimeters. The biomass particles are then heated to a temperature higher than AKD or resin melting temperature but lower than the biomass degradation temperature, preferably 80-130° C. for 10 to 60 minutes. The mixture may be heated one or more treatment cycles, depending on hydrophobic chemical selected, equipment utilized, and final effect desired. The treated fillers are cooled down to room temperature and collected.

More broadly, the biomass may be derived from various agricultural materials such as grass, wheat straw, waste papers, algae, bamboo, banana, kapok, coir, cotton, flax, hemp, jute, kenaf, lyocell, modal, piria, raffia, ramie, rayon, sisal, soy protein, apocynum cannabinum, cedar bark textile, esparto, fique, papyrus, sisal, straw, tapa textile cloth, wood, and other similar natural biomasses, and combinations thereof.

Small amount of water (0.1 to 3 times of biomass weight) may be added to the grinder and milling machine during grinding to enhance blending and coating of AKD particles. More water, saying 3-20 times of biomass weight, can also be used. However, large amount of water may cause difficulty in grinding and milling operation. Importantly, it cause more energy consumption for dewatering and drying.

Multistep thermal treatment may be adopted if it is needed. The first thermal treatment step may be dewatering and drying at temperatures between 25° C.-90° C., followed by a curing step between 40° C.-250° C. but preferably between 80° C.-130° C.

The whole AKD or resin pellets can be pre-grinded into small particles before mixing them with biomass. The smaller the AKD particle size, the better the mixing and final coating efficiency. The preferable particle size of AKD and resin is between 100 nanometers to 300 micrometers.

The biomass can also be pre-grinded biomass with a particle size from a few micrometers up to tenth millimeters, such as fibers, pellets, fiber dust, fiber mat, textile or non-woven fabric, grinded grasses, wood sawdust, papers and like.

The hydrophobic chemical modification agent may be alkyl ketene dimer (AKD) wax or emulsion, alkenyl succinic anhydride (ASA), rosin, rosin salts, molecules with alkyl chains (5-18 carbons) and epoxy groups, alkyl molecules with anhydride groups; alkyl molecules with cationic charges, alkyl molecules with acryl groups or a combination thereof.

The hydrophobic chemical modification agent can also be an emulsion or water suspension. Common paper sizing emulsion, such as AKD or rosin emulsions could be added to a grinder or milling machine during raw biomass grinding process, followed by the drying and thermal treating steps described above.

Example 1: Alkyl Ketene Dimer (AKD) Coated Cotton Fabric Prepared for Selective Oil Absorption The alkyl ketene dimer (AKD) coated cotton fabric may be prepared for selective oil absorption. Prior to AKD coating, the fabric may be washed with deionized water to remove impurities and then dried. The cotton fabric may be precut into 5.1 cm×5.1 cm in size and 0.36 mm of average thickness. 1.5% of the alkyl ketene dimer (AKD) on a basis of the cotton fabric dry weight, may be dissolved in chloroform for dipping the cotton fabric. After dipping the fabric into the AKD solution, the fabric may be allowed to dry for about 1 hour in a fume hood and then may be placed into drying oven at 105° C. for 0.5 hours. After repeating the dipping procedure, double the alkyl ketene dimer (AKD) coated cotton fabric may be prepared and then used for the selective oil absorption tests.

The composition for polymerization and grafting to the polysaccharide may be used for selective oil absorption. A cotton ball with larger inside space volume may be used together with the alkyl ketene dimer (AKD) coated fabric. The cotton ball may be placed in alkyl ketene dimer (AKD) coated fabric bag for the selective oil absorption. A non-coated fabric bag containing similar cotton ball may also be prepared for the control test. Prior to the selective oil absorption test, water adsorption test may be performed. The cotton ball inside non-coated bag may adsorb the water which may be pre-dyed with yellow color. In contrast to the non-coated bag, the cotton ball inside the coated bag may remain dried without the water adsorption. Oil-water mixture separation may be tested using 10 ml of oil, which may be a red color solution, and 20 ml of water dyed with yellow color. In order to study the separation efficiency, each bag containing cotton ball may be immersed in the mixture for 5 min.

According to experimental results for selective oil absorption, water adsorption (wt %) is 0.7 and oil adsorption (wt %) is 99.0 for the alkyl ketene dimer (AKD) coated bag. Water adsorption (wt %) is 22.3 and oil adsorption (wt %) is 97.1 for the non-alkyl ketene dimer (AKD) coated bag, which illustrates efficiency of water and oil adsorption for the non-alkyl ketene dimer (AKD) coated and non-coated bags with cotton ball. The non-alkyl ketene dimer (AKD) coated bag may repel water with higher efficiency as compared to non-coated bag. The highly hydrophobic the non-alkyl ketene dimer (AKD) coated fabric bag presented 0.7 wt % water adsorption while non-coated bag shows 22.3 wt % water adsorption. The results also show that the non-alkyl ketene dimer (AKD) coated bag may absorb most of oil part in the mixture with 99% efficiency.

Example 2: Alkyl Ketene Dimer (AKD) Coated and Uncoated Fibers

Two different beakers with oil and water are prepared and the alkyl ketene dimer (AKD) coated and uncoated fiber compositions may be used for comparison. A nylon mesh bag that does not absorb the water or the oil may be filled with the coated and uncoated fibers. The nylon mesh bags then may be immersed in the beakers containing water and oil separately. The change in weight may be measured after 10 minutes to 3 hours.

Results for selective oil absorption. The change in weight for each nylon bag may be measured indicating the differences in oil and water absorption capacity of the coated and uncoated agricultural fibers. The uncoated fibers show a water absorption capacity of 4 g/g and an oil absorption capacity of 3 g/g, whereas the coated fibers show a water capacity of 0.7 g/g and an oil capacity of 2.5 g/g.

Example 3: Alkyl Ketene Dimer (AKD) Coated Cotton Fabric Prepared for Chloroform Absorption The chloroform-water mixture separation may be tested using 50 ml of chloroform, clear solution and 50 mL of water which may be dyed with pink color. The non-alkyl ketene dimer (AKD) coated cotton fabric may be inserted into separation funnel and the prepared chloroform-water mixture may be poured to the funnel. The separation may be done under the action of gravity. Due to the higher density of chloroform than water, the chloroform in the mixture may pass through the non-alkyl ketene dimer (AKD) coated fabric quickly, and no visible water may be observed in the collected chloroform, and a complete separation may be achieved for the chloroform-water mixture.

Example 4: Alkyl Ketene Dimer (AKD) Coated Broadcloth Cotton Fabric

A 6 in×6 in swatch of broadcloth cotton fabric was provided. A 250 ml beaker of well homogenized AKD suspension with 3% solids content was provided. The fabric was dipped in the suspension for 10 minutes. The fabric is removed and allowed to air dry on a dry surface in a standard lab oven at 105° C. for 1 hour. The fabric is removed and allowed to cool down to room temperature. The resulting fabric is hydrophobic, where water dropped on it forms a bead and does not pass through while an oil droplet is instantly absorbed. This performance is observed to be the same as commercially obtained polypropylene absorbent skin. Whereas, the untreated broadcloth fabric absorbs both water and oil droplets instantly. Results are shown in FIG. 1.

Figure 2:
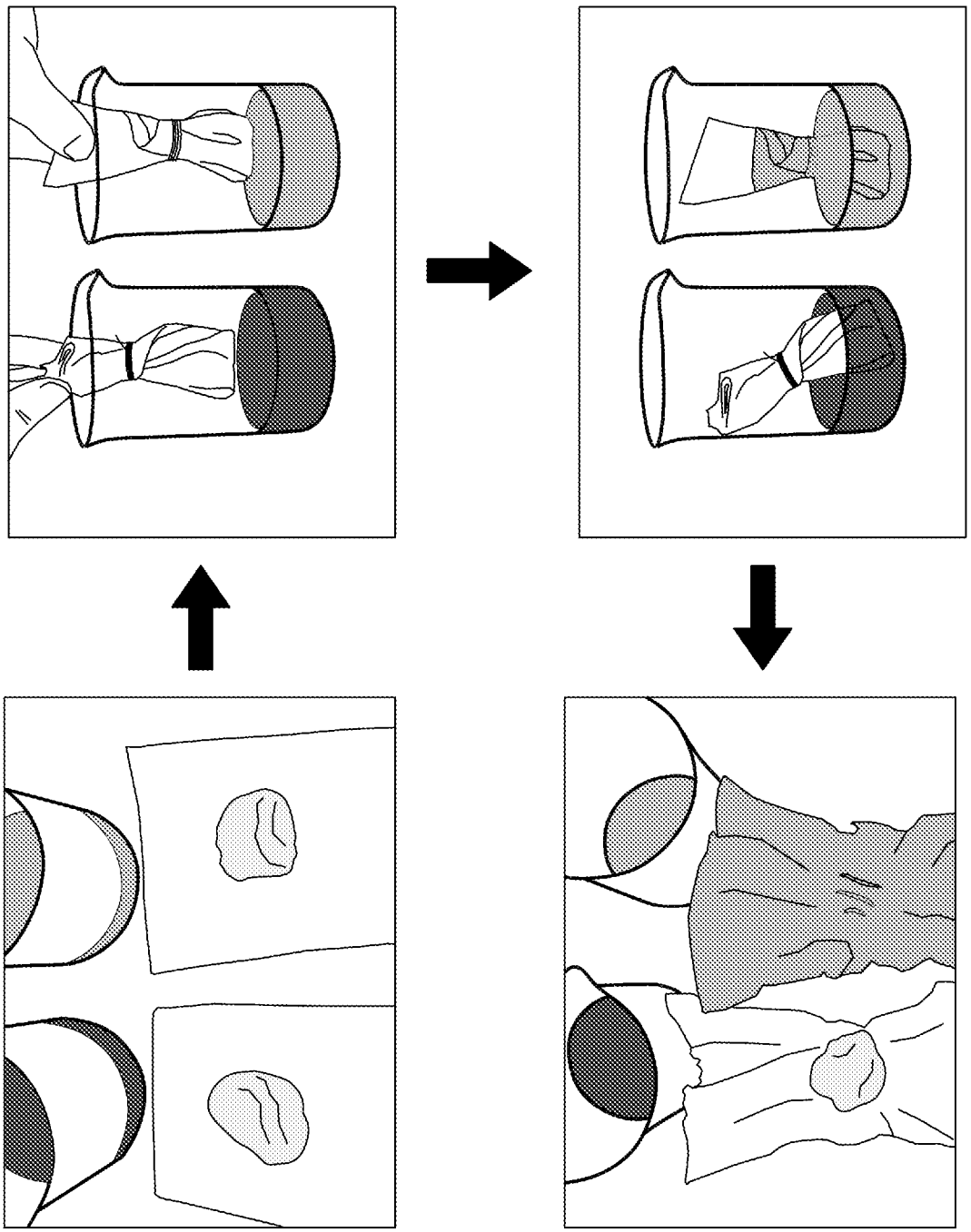
FIG. 2 is a picture showing cotton balls (about 5 grams) were wrapped in 12 in×12 in AKD treated hydrophobic fabrics (8 oz Duck Canvas) to form two small bags. The cotton ball containing bags were submerged in two different beakers containing oil (colored in orange) and water (colored in blue) respectively. After 15 minutes, the backs were taken out and the weight change of the back were measured. The results show that there is almost no weight change for the bag immersed in water, but the bag weight increased more than 10 grams, indicating water did not pass through the hydrophobic fabric but oil can permeate through it quickly.

Example 5: Alkyl Ketene Dimer (AKD) Coated Duck Canvas Fabric 12 in×12 in swatch of 8 oz Duck Canvas fabric was provided. A 250 ml beaker of well homogenized AKD suspension with 5% solids content was provided. The fabric was dipped in the suspension for 10 minutes. The fabric is removed and allowed to air dry on a dry surface. After the fabric is dried it is dried in a standard lab oven at 105° C. for 1 hour. The fabric is removed and allowed to cool down to room temperature. The resulting fabric is hydrophobic, where water splashed on it forms a bead and does not pass through while oil is instantly absorbed. The fabric is cut into smaller swatches and then formed into two small bags. Small cotton balls are filled inside the bags and they were sealed. Two beakers containing dyed water (blue) and oil (orange) separately were used to estimate breakthrough time of each liquid. The cotton ball containing bags were submerged in the liquids in their respective beakers. After three hours the bags are removed. The bag submerged in the beaker with oil is colored orange while the cotton ball in the beaker containing water is the same as it was when initially submerged, showing that only oil permeated through the cotton fabric, whereas no water could pass through. Same test was repeated with a beaker containing both dyed oil and water, and a fabric bag containing a cotton ball was submerged in the oil water mixture. The bag was removed after three hours and the cotton ball and fabric were stained orange, again showing that the fabric is rendered completely hydrophobic but only permeable to oil. Results are shown in FIG. 2.

Example 6: Corn Cob Powder and Ground AKD Powder

Figure 3:
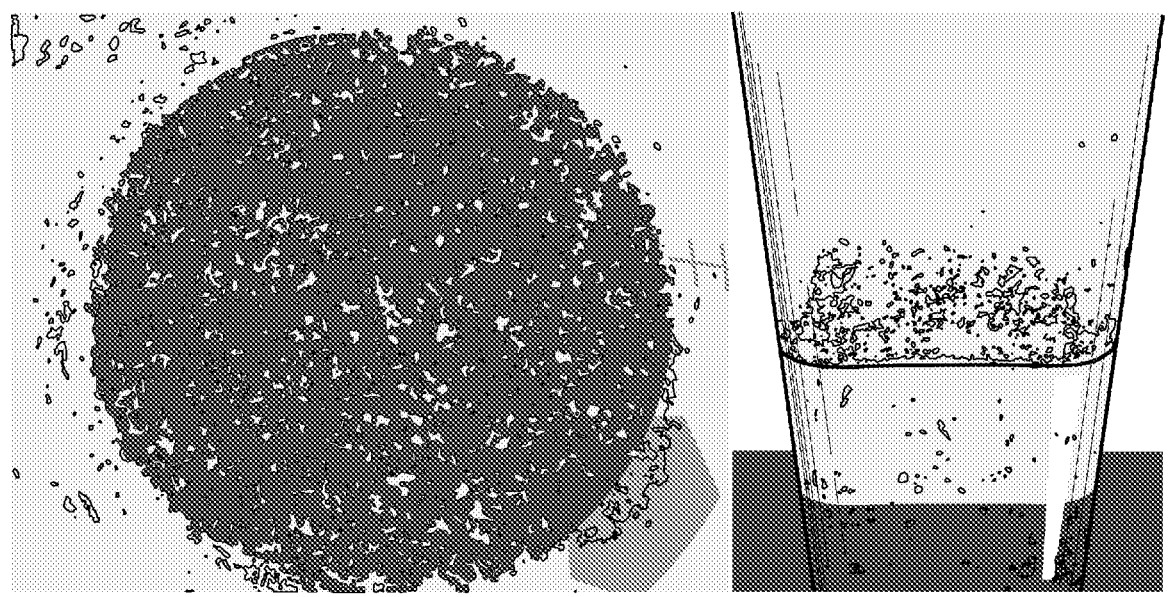
FIG. 3 is a picture showing AKD treated dry corn cob powder (left), and in water. It can be seen the AKD treated corn cob powder floating on water surface indicating they are hydrophobic (right).

Commercially obtained corn cob powder was directly mixed with finely ground AKD, forming an approximately 5%-5.5% coating ratio of AKD on corn cob. In this case mixing was done by hand stirring with a small spatula. Water was slowly added until the mixture was uniform (see FIG. 3). Various mixtures and drying temperatures were used to measure the hydrophobic effect on the resulting powder. Testing conditions and results are shown in Table 1.

TABLE 1 shows testing conditions and results for corn cob powder coated with AKD.

| Sample | Water:Corn Cob ratio (g/g) | Drying Temperature (° C.) | Drying Time (hours) | Dispersion in water |
|---|---|---|---|---|
| 1CC | 0 | 110 | 0.5 | Initially particles float but sink after 5 minutes of agitation. |
| 2CC | 0.7 | 120 | 2 | Very hydrophobic, no particles sink to even after intense agitation. |
| 3CC | 1.33 | 100 | 10 | Hydrophobic but some particles sink to the bottom after agitation. |

Example 7: Miscanthuan Grass and Ground AKD Powder

Commercially obtained Miscanthuan grass was directly mixed with finely ground AKD particles, forming an approximately 4% coating ratio of AKD on grass. In this case mixing was done by hand stirring with a small spatula with the properties in the Table 2.

TABLE 2 shows testing conditions and results for miscanthuan grass coated with AKD.

| Sample | Water:grass ratio (g/g) | Drying Temperature (° C.) | Drying Time (hours) | Dispersion in water |
|---|---|---|---|---|
| 1MG | 1.22 | 110 | 2.5 | Hydrophobic but some particles sink to the bottom after agitation. |

Example 8: Treated and Untreated Fabric and Biomass Absorbents

Figure 4:
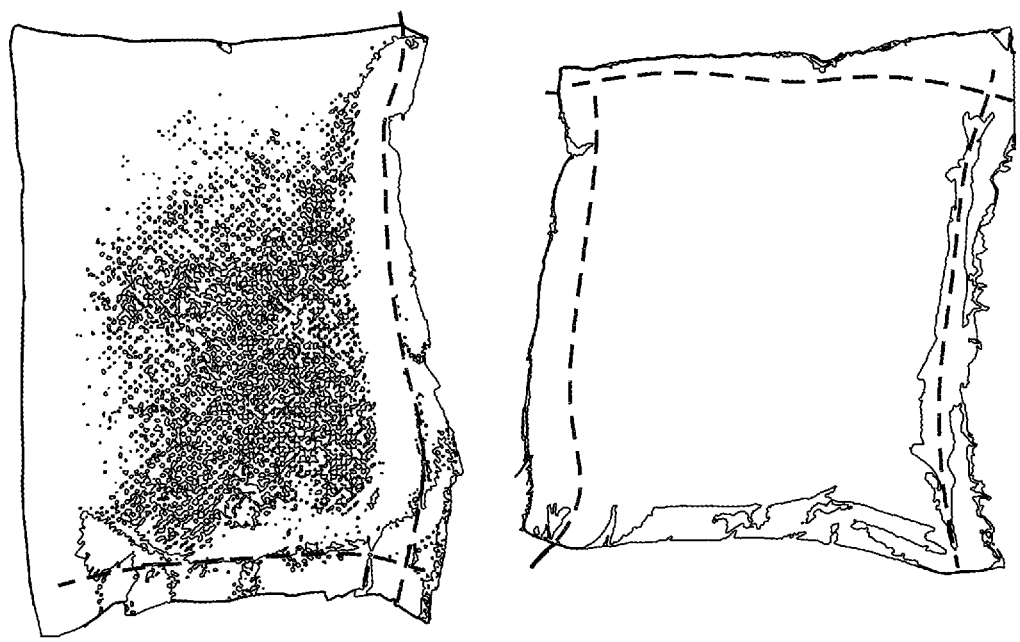
FIG. 4 is a picture showing the absorbent bags made by filling AKD treated corn cob powders in untreated porous cotton fabric bag (left) and in AKD treated cotton bag (right).

Treated and as obtained fabrics as shown in examples 4 and 5 were used and treated and as obtained raw biomass corn cob and grass were used to fabricate various absorbent combinations. The fabrics were used as the skin materials and the corn cob and grass were used as the filler. These were then used to measure the water and oil absorbency of the absorbents fabricated. Results are shown in Table 3 and FIG. 4.

TABLE 3 shows testing conditions and results for treated and untreated fabric and biomass coated with AKD.

| Sample | Dry Weight (g) | Water absorbed after 15 minutes (g) | Water absorbed (g)/g of absorbent |
|---|---|---|---|
| As Obtained Cotton + 1MG | 23.8 | 5.23 | 0.22 |
| AKD Treated Broadcloth + 1MG | 26 | 1.31 | 0.05 |

Example 9: Wheat Straw Filler Made Directly from Dry Fine AKD Particles

Dried wheat straw was cut into ~2-3 inches. 50 g such wheat straw was directly mixed with 2.4 g dry AKD powder without water. The AKD to in wheat straw is about 4.6%. The mixture was blended using a food blender about 10 minutes. The wheat straw was blended into particles with a size <5 mm. The blended particles was put in an oven at 120° C. for 2 hours to allow AKD fin particles melt and coat to wheat straw particles. The AKD treated wheat straw particles was dispersed in large amount of water with gentle stirring for 5 minutes. After stop the agitation, more than 98% particles float on water surface, suggesting the particles are hydrophobic.

These treated particles was filled an AKD treated carton fabric cloth bag to make pillows. The oil absorption of the pillow was tested. Engine oil was used for absorption. The oil was on a water surface (about 0.5 cm thick oil layer). The pillow was place on the surface of water/oil without agitation.

After certain time, the pillows were saturated by oil. The amount of water and oil left in the container were measured. Results are shown in Table 4.

TABLE 4 shows testing conditions and results for wheat straw filler coated with AKD.

| Sample # and mass (g) | Time to saturated absorption | Oil added (ml) | Oil left (ml) | Water added (ml) | Water Left (ml) | Oil absorbed | Oil absorption capacity (ml/g) |
|---|---|---|---|---|---|---|---|
| AKD modified wheat straw pillow 8.09 g | <0.5 h | 100 ml | 42 ml | 350 ml | 350 ml | 58 ml | 7.17 ml/g |

Example 10: Biodegradability and Compostability Test

Cotton fabric and all the biomass mentioned in examples 1-9 is known to be biodegradable. The samples coated with AKD were buried in soil and samples were taken after 2 weeks, 1 month, 2 months, and 3 months and weighed to check the level of biodegradation.

Tests according to ASTM D 6400 (or DIN EN ISO 14855 or DIN EN 14046) dictate that a material is biodegradable if all organic compounds are decomposed in different chemical structures which are also naturally metabolites. This must happen during organic composting. All biomass mentioned here (commercially available and treated with AKD) fulfill these parameters.

Example 11: Water Absorption Capacity o

The hierarchical structure of cellulose depends upon hydrogen bonding between different hydroxyl (—OH) group networks. Both inter and intra molecular hydrogen groups are present. In wet conditions the hydroxyl groups may contain a water molecule between the hydroxyl groups as a "bridging" water molecule that hydrogen bonds to two hydroxyl groups. This is when the cellulose is wet, and the fibers are swollen with water.

If the cellulose is never dried (virgin pulp) the ability to maintain fiber swelling is the highest since no water has even been removed from within the cellulose and no structural change within the free hydroxyl networks has occurred. If the pulp is dried the ability to swell back by absorbing water to the original fiber size is reduced. The higher the temperature and the longer the period of thermal exposure, the greater the loss is in swelling by water absorption. For some purposes such for paper making and fabrics, thermal exposure is limited to a minimum temperature and time necessary, to obtain desired properties and to limit hornification a process that occurs due to thermal exposure of cellulose. Hornification causes an increase in crystallinity, shrinking of fibers, degradation of the amorphous cellulose phase, and most notably an increase in the hydrophobicity of the material. This is attributed to the reduction in free hydroxyls available to hydrogen bond with water after hornification. Hornification causes a decline in properties of the paper and fabric. The paper may become more brittle, absorb less water, may not be suitable for writing, etc. Fabrics may exhibit yellowing due to thermal exposure.

Hornification may be undesirable for paper making since it causes structural changes in the structure of the final product. However, we have a designed degree of thermal exposure that causes hornification to get desired hydrophobic properties in conjunction with a hydrophobic chemical modification agent. With elevated temperature drying of the substrates, the goal is not only to chemically bond the hydrophobic agent to the fiber surface via a covalent bond, but also to drive hornification of the cellulose substrate.

Figure 5:
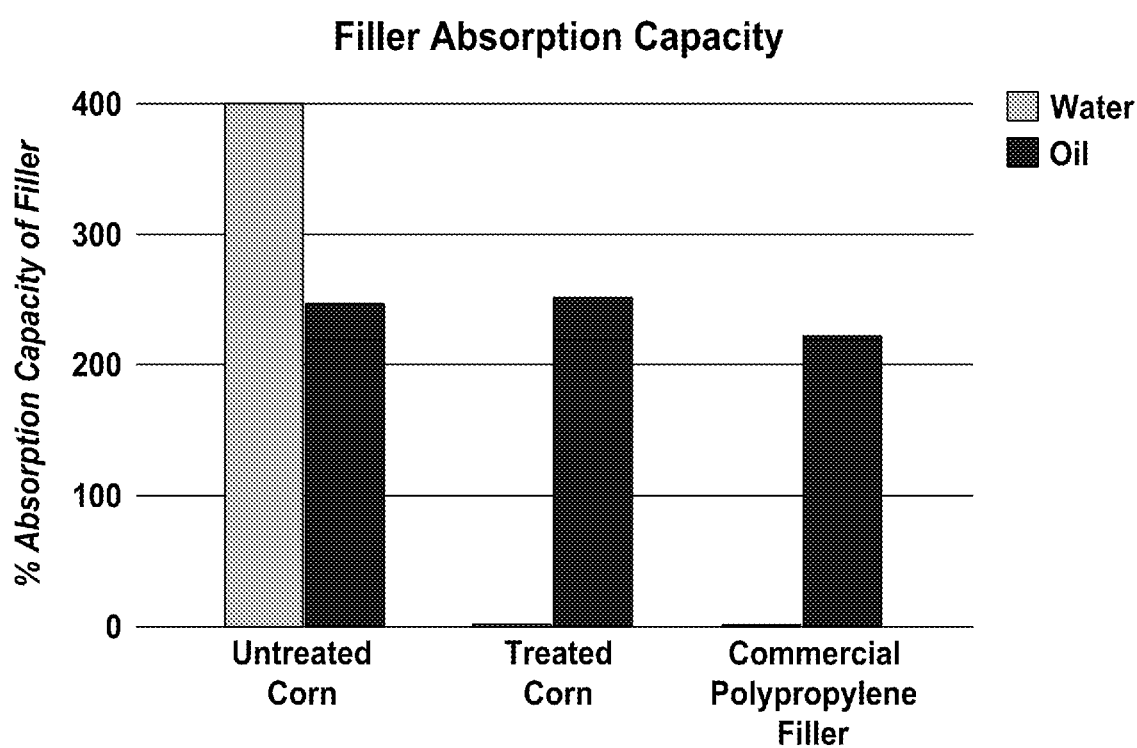
FIG. 5 is a bar graph showing the results for the water absorption capacity assay for untreated, treated and commercial polypropylene filler.

The water absorption capacity which measures how much water is absorbed g/g was assayed for untreated and treated material and commercial polypropylene filler. The results are shown in FIG. 5 and Table 5.

Table 5. shows the water absorption capacity for untreated, treated and commercial polypropylene filler.

| Material | Water (%) wrt material | Oil (%) wrt material |
|---|---|---|
| Untreated Biomass Filler | 400 | 248 |
| Biomass Filler with Heat Treated Only (Temp 130° C./1 hour) | 320 | 223 |
| AKD Treated Biomass Filler (Temp:110-130° C./Time: 1 hour) | 2.74 | 252 |
| Commercial Polypropylene Filler | 1.82 | 360 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

What is claimed is:

1. An absorbent composition comprising a hydrophilic cellulosic material functionalized with one or more hydrophobic chemical modification agents;
    wherein the one or more hydrophobic chemical modification agents comprise an alkyl ketene dimer (AKD), alkenyl succinic anhydride (ASA), rosin, rosin salts, cationic molecules with alkyl chains (5-18 carbons) comprising quarternary ammonium surfactant such as C8-10 alkylamidodimethyl propylamines, C8-10 alkyl hydroxyethyl dimethylammonium chloride, and epoxy groups such as 2-(tertbutyl) oxirane, and 2-cyclohexyloxirane, alkyl molecules with anhydride groups such as carboxylic anhydride, alkyl molecules with acryl groups such as alkyl acrylates, polyacrylate, poly(methyl methacrylate), or a combination thereof;
    wherein the one or more hydrophobic chemical modification agents are polymerized with or grafted to the hydrophilic cellulosic material via a chemical, physical or ionic bonds; and
    wherein the hydrophilic cellulosic material exhibits an increased level of hornification;
    wherein the absorbent composition is a biodegradable water repellent article having an outer surface formed of a biodegradable water repellent cloth and wherein the biodegradable water repellent article is filled with biodegradable water repellent particles.

2. The composition of claim 1, wherein the hydrophilic cellulosic material is a lignocellulosic material.

3. The composition of claim 1, wherein the hydrophilic cellulosic material is derived from an agricultural material.

4. The composition of claim 1, wherein the hydrophilic cellulosic material is raw or pre-grinded.

5. The composition of claim 1, wherein the hydrophilic cellulosic material is a banana fiber, pineapple fiber, cotton fiber, palm fiber, corn fiber, corn husk, corn pith, corn chaff, corn cob, corn cob powder, jute fiber, bamboo fiber, sisal fiber, cellulose fibers, grass, wheat straw, waste papers, algae, wood, kapok, ccoir, flax, hemp, kenaf, lyocell, modal, raffia, ramie, rayon, soy protein, apocynum cannabinum, cedar bark textile, esparto, fique, papyrus, straw, and tapa textile cloth, or a combination thereof.

6. The composition of claim 1, wherein the hydrophobic chemical modification agent is an alkyl ketene dimer (AKD).

7. The composition of claim 1, wherein the composition exhibits a water retention value of from 0.1 L/lb to 5 L/lb.

8. The composition of claim 1, wherein the hydrophobic chemical modification agent(s) is present in an amount of from 0.5 wt % to 10 wt % by weight of the hydrophilic cellulosic material.

9. The composition of claim 1, wherein the hydrophobic chemical modification agent is in the form of a solid, a solution, a suspension, or an emulsion.

10. The composition of claim 1, wherein the hydrophilic cellulosic material is functionalized with one or more hydrophobic chemical modification agents at a temperature that can range from room temperature to 200° C.

11. The method of claim 1, wherein the hydrophilic cellulosic material is a cellulosic natural fiber-based cloth.

12. The composition of claim 1, wherein the article is in the form of an absorbent pillow.

13. The composition of claim 1, wherein the article is in the form of an absorbent boom.

14. The composition of claim 1, wherein the article is in the form of an absorbent sock.

15. A method of making an absorbent composition comprising:
   a) contacting a hydrophilic cellulosic material with one or more hydrophobic chemical modification agents to form a precursor mixture; and
   b) allowing the one or more hydrophobic chemical modification agents to react with the hydrophilic cellulosic material to form absorbent composition of claim 1.

16. A method of using the absorbent composition of claim 1 for absorbing oil from the surface of an object, comprising scattering the biodegradable water repellent particles of claim 1 directly onto the oil on the surface of an object.

17. A method of using the absorbent composition of claim 1 for selective oil absorption or chloroform absorption, comprising contacting oil with the absorbent composition.

* * * * *